July 13, 1965
R. K. MELZER
3,194,052
TESTING METHOD
Filed Oct. 4, 1962
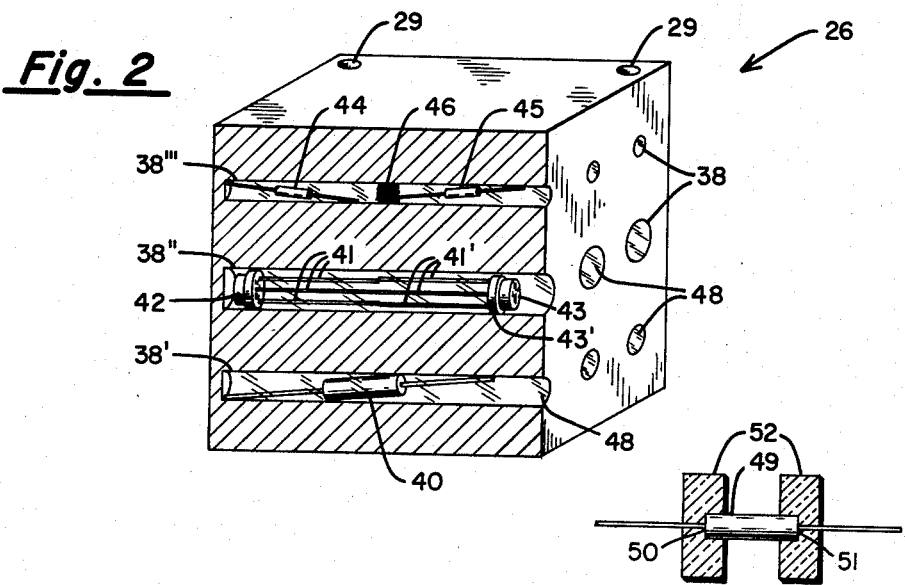
Fig. 2
Fig. 3
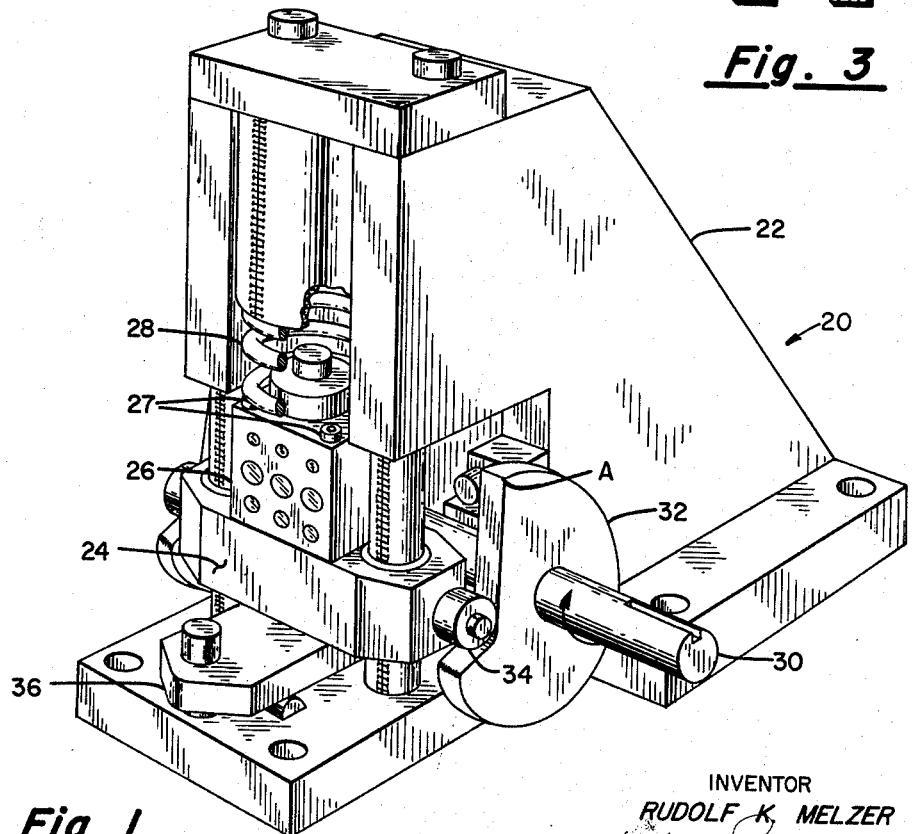
Fig. 1
INVENTOR
RUDOLF K. MELZER
BY
ATTORNEY

United States Patent Office 3,194,052
Patented July 13, 1965

3,194,052
TESTING METHOD
Rudolf K. Melzer, St. Paul, Minn., assignor to Sperry
Rand Corporation, New York, N.Y., a corporation of
Delaware
Filed Oct. 4, 1962, Ser. No. 228,340
13 Claims. (Cl. 73—12)

This invention relates in general to material testing procedures and more specifically to a method for mounting materials to be tested.

Present day scientific investigations often require the exposure of various types of assemblies to physical shocks and impacts resulting from accelerative and decelerative forces. Materials, generally in the form of specific components, used in the fabrication of these assemblies are critically examined to determine whether they will remain functional after exposure to such forces. The examination or testing procedures used for such determination are designed to subject the materials, including the components, to mechanical forces which simulate the forces mentioned above. Shock-testing and vibration-testing machines of various types are normally used to generate these mechanical forces. The components under test are appropriately associated with or secured to the testing machine by way of a holding fixture so that the forces developed by the machine may be imparted to the components.

A critical part of the shock-testing procedure relates to the transmission of the generated forces to the component under test. Effective testing requires that the component be subjected to a predetermined amount of force and it is, therefore, very important that the force, or a known portion of the force, generated by the machine be transmitted through the holding fixture to the component mounted therein. Accordingly, it is important that the component be mounted within the fixture in a manner and by a material which permits transmission of a very substantial and determinable portion of the machine generated mechanical forces. In the past the mounting of the component within the fixture has been accomplished by embedding the component in a material within a cavity formed in the fixture. The embedding material is usually a hardenable cement-like compound, such as an epoxy resin, which is at least initially fluid enough such that it may be poured or cast into the fixture cavity. The embedding compound encapsulates the components and when the compound hardens, the fixture, components, and compound approximate what may be termed, at least for test purposes, an integral unit. The mounting compound serves to transmit or transfer forces to which the fixture is subjected to the component mounted therein.

In the past, epoxy resins have been used extensively as the encapsulating material. However, the use of epoxy compounds is economically objectionable in that a substantial amount of time is required to embed the component and to remove the compound from the component after exposure to generated mechanical forces and completion of any other tests. Removal of the compound is required in order to permit structural and electrical analysis of the component to determined its reaction to the imposed mechanical forces. Since the curing time of some epoxy compounds is an long as twenty-four hours, and since longer periods of time are frequently required to remove the compound from the component, an extensive total amount of time is necessary to permit testing to be completed. In addition, the chemicals employed, that is, the resins, and the solvents therefor are relatively expensive. Further, the use of these chemicals often necessitates special handling procedures so that personnel using the chemicals will not be unnecessarily exposed to their deleterious qualities. Another serious objection to the use of epoxy resins for mounting the components within the fixture is that during the removal of the hardened resin from the components through the use of suitable solvents, the components may be severely damaged by the solvents and thereby rendered unfit for further service. A further objection to the use of epoxy and epoxy-like mounting compounds involves the fact that these compounds transmit only about ninety-five percent of the mechanical forces acting upon the fixture to the component mounted therein.

These many objections to the prior art mounting methods are obviated by the present invention where, in accordance with one aspect thereof, there is provided a holding fixture wherein a plurality of bores or cavities are formed for containing one or more of the components to be subjected to shock tests. The components are inserted into the appropriate cavities and the cavities are then filled with water. The holding fixture together with the components disposed therein is then subjected to a low temperature for causing the water surrounding the components to solidify. After the freezing step is complete, the fixture is appropriately mounted upon a shock-testing machine, which is preferably maintained in an atmosphere of reduced temperature, and exposed to generated mechanical forces. When the shock exposure has been completed, the ice is permitted to melt and the tested components are then removed from the fixture. Thereafter the components are examined for determining shock damage.

It is, therefore, a primary object of the present invention to provide an improved and economical method for mounting components for testing.

It is also an object of this invention to provide a method for mounting components to be tested wherein the mounting and unmounting of the components is accomplished in a relatively short period of time.

It is also an object of the present invention to provide a method for mounting components to be tested which permits the components to be of further service after testing is complete.

It is also an object of the present invention to provide a method for mounting components to be tested wherein the mounting material employed is very inexpensive.

It is a further object of the present invention to provide a method for mounting components to be tested wherein ice is used to secure the components to the holding fixture.

It is a still further object of the present invention to provide a method for mounting components to be exposed to mechanical forces which permits substantially all of the generated forces to be transmitted to the components.

These and other more detailed and specific objects will be disclosed in the course of the following specification, reference being had to the accompanying drawings, in which:

FIG. 1 is a front perspective view of a shock-testing machine.

FIG. 2 is a perspective view partially in section of the holding fixture employed with the present invention.

FIG. 3 is a front view partially in section of a component partially encapsulated by a mounting medium.

Referring now to FIG. 1, there is seen a reliability or shock-testing device or apparatus 20 suitable for inducing sudden impulses or shocks which may be applied to components or materials which are intended to be used in an environment where they will be subjected to substantial mechanical forces. The shock-testing apparatus 20 includes a frame member 22 for securing the parts thereof in fixed relation and a table or support member 24 whereon is mounted a test fixture 26. The fixture 26 is secured to the member 24 by several screws 27 (only two of which are seen) which pass through the fixture 26 by way of corner-located apertures 29 (see FIG. 2) and threadedly engage the member 24. A potential energy storage source in the form of a compression spring 28 in contact with the fixture 26 is loaded by a motor (not shown) which drives the shaft 30 in the direction of the arrow. The shaft 30 drives the actuating cam 32 which causes the table 24 to move upwardly compressing the spring 28 a predetermined amount. When the roller 34 passes point A on the cam, the table 24 and the fixture 26 move downwardly under the force generated by the released spring 28. The table 24 is forced against the resisting spring 36 which causes a sudden velocity change in the motion of the table for producing shock or accelerative and decelerative forces in the fixture 26.

Referring now to FIG. 2, there is seen an enlarged view of the mounting or holding fixture 26 wherein there are formed a plurality of elongated cavities or cylindrical bores generally designated 38. Within the bores 38 there is disposed a plurality of electrical components, such as, the resistor 40 located in the bore 38′, the pair of transistors 42 and 43 situated in the bore 38″, and the diodes 44 and 45 in the bore 38‴.

A fire fuzz spacing means or pad 46 is disposed between the diodes for maintaining them in spaced apart relation. The components are inflexibly or fixedly secured to the fixture by the ice 48 which in the preferred embodiment fills the bores, substantially encapsulating or embedding the components contained therein. Those portions of the components with which the test is not particularly concerned, for example, the end portions of the leads on the diodes need not be encapsulated, so that in some cases it would not be necessary to have each bore completely filled with ice. In the preferred embodiment of the present invention, the fixture is cubical in shape although it may assume any of many shapes as long as the shape is compatible with the particular test procedures and apparatus employed. Additionally, no limitation is intended by illustrating cylindrical bores, in that the bores may have any geometry which will best accommodate the component to be tested. It is recommended that the material from which the fixture is fabricated be of a type that exhibits uniform thermal conductivity throughout to permit uniform formation of the ice in the bores, such a material being, for example, an aluminum alloy. The bores are arranged in the fixture as compactly as possible to permit the testing of a maximum number of components at one time. The wall thickness between the bores, as a practical matter, should be such that the fixture is not deformed by ordinary handling procedures and adequate to prevent components in adjacent bores from adversely affecting or from coming into contact with one another. The width of any bore should be such that the components accommodated may be easily inserted and withdrawn therefrom. Generally, it is preferable to insert only one component in each bore in order to avoid having two components in contact with each other during testing. It will be appreciated by those skilled in the art that the transmissibility of shock forces through one component into another in contact therewith may be such as to render the test inaccurate. However, if it is desired to mount more than one component in a single bore, a means for spacing the components could be employed to avoid component contact. Such a means could take the form of the pad 46 seen between the diodes 44 and 45. The pad 46 may be formed, for example, from stainless steel wire or other types of material that would not be readily adversely affected by exposure to water. The diode leads may be in contact with the spacing means 46 without affecting the purpose of the test. Where the components have means for spacing themselves, such as the leads 41 and 41′ on the transistors 42 and 43 respectively, it is, of course, not necessary to use additional spacing means.

It should also be noted at this time that a portion of a bore-contained component may be in physical contact with the wall of the bore as long as the component is immovably secured within the bore and otherwise completely encapsulated by the ice. As a practical matter the components are inserted into the fixture when the fixture is in an upright position, that is with the bores being vertically disposed. Since the bores have a width measurement at least a little larger than that of the component inserted therein, the component rests within the bore at a slight angle thereto. This angular disposition is best illustrated by the resistor 40 where it can be seen that one of its leads is touching the bottom wall of the bore 38′ and the other lead rests against the side wall of the bore. In another case a portion of the component proper, such as the ridge 43′ on the transistor 43, may be in direct contact with a portion of the fixture without seriously affecting the transmission to the component of forces imparted to the fixture.

According to the preferred method of the present invention the bores 38 are filled with water after the components have been appropriately disposed within the bores. Although substantially pure water may be used, it is preferred that the water employed contain some contaminants, such as, for example, are found in ordinary tap water. Impurities in the water are believed to cause the water to freeze more uniformly and thus minimize the development of internal stresses within the forming ice. For releasing air which may be adhering in the form of bubbles to the surface of the immersed components, the fixture may be gently tapped or otherwise subjected to some modest force to cause the air bubbles to leave the component and rise to the surface. Where the component to be tested exhibits a configuration having holes or pockets, care should be taken to properly dispose the component in the bore so that air will not be trapped in these holes or pockets.

After the bores have been filled with water, the fixture is placed in an apparatus or compartment for freezing the water. The water surrounding the components disposed in each bore solidifies thereby freezing in-situ the materials to be tested. When electrical components are to be mounted according to the present invention, it is preferred that the ice be formed in the temperature range of from below 0° C. to about −10° C. At the lowermost portion of the temperature range, provided the fixture employed has no unusual configuration, the ice is formed in approximately fifteen minutes. Freezing could also be accomplished at temperatures lower than −10° C., however, experiments have shown that at lower temperatures, stress forces sometimes develop in the forming ice which may damage the components mounted therein. It will be appreciated that the different types of components vary in their resistance to such stress forces and accordingly in particular cases, the ice may be formed at temperatures outside of the preferred range. For example, certain types of diodes have been frozen at temperatures in the range of −40° C. to −50° without sustaining damage. The above mentioned preferred freezing temperature range was selected because when freezing of the water occurs within this range, the components are exposed to minimal stress forces developed during the forming of the ice. Because water exhibits the peculiar characteristic of expanding on freezing, it can be seen that when ice is employed as a mounting medium, the mounted component is securely attached within the fixture, the expanding ice being firmly held against the bore walls. Additionally, as the ice forms, it takes on a crystalline structure very similar to the crystalline structure of the material from which the fixture is fabricated. This epitaxial growth facet is considered very desirable in a compound used for mounting components to be subjected to shock forces, for it is believed that if the mounting medium and the fixture have similar crystalline structures, a greater proportion of the forces imparted to the fixture is transmitted to the medium than would be the case if the structures were different. The force transmission is also believed to be more uniform.

Although ice is the preferred mounting medium of the present invention, particularly when the component is to be shock-tested, other compounds or materials may be used in lieu thereof. Of course, many of the compounds that may be used in lieu of ice will not be capable of transmitting substantially all of the machine generated forces to the mounted component, however, such compounds may be used, for example, for mounting components or materials to be subjected to vibration tests or other tests where the portion of forces transmitted to the component is not particularly critical. Generally speaking, such other materials should possess certain physical characteristics, such as, for example, the ability to undergo a reversible change between a solid and liquid state at a tolerable temperature range. By a tolerable temperature range is meant a range of temperatures to which the components to be tested may be exposed without danger of damage. Additionally, the coefficients of expansion or contraction of the material should be of a degree that can be tolerated by the component. Also the material should be chemically compatible with the component such that no deleterious chemical reaction occurs therebetween. Thus materials such as mercury or orthozylene may also be used as a mounting medium or embedding compound. When a material, such as mercury, is used as the embedding compound it may be preferable to mount the component prior to locating it in a fixture for being secured to the testing machine in order to accommodate the contraction of the mercury upon freezing. The mercury may be cast about the component while it was disposed in a separable mold that would permit the frozen mercury and the component which is embedded therein to be removed from the mold. Thereafter the embedded component may be mounted in a test fixture if desired, or otherwise secured to the test machine.

It should also be noted that where the component is to be mounted for vibration tesing, for example, it is not necessary to embed the component completely. As is seen in FIG. 3, the diode 49 merely has its end portions 50 and 51, where the leads join the diode proper, encapsulated by the mounting medium 52.

After the components have been inflexibly frozen in the fixture, the fixture is removed from the freezing compartment and ice formations above the surface of the fixture caused by ice expansion may, if desired, then be removed, as by abrading, for causing the exposed surface of the ice to be flush with the surface of the fixture. Thereafter the fixture is properly mounted on the shock-testing machine. Preferably the machine is maintained at a temperature below the freezing point of water, for example, by keeping the machine in a refrigerated chamber, to permit testing to be accomplished without undue haste. After subjecting the components to the desired mechanical forces, the ice is permitted to melt and the components may then be removed to determine the effect of such forces upon them.

Although the foregoing has discussed the use of the present invention with a shock-testing machine, it can be seen that the invention may also be used with other test apparatus and to generally mount components in a rapid and economical manner to permit testing thereof. It can also be seen that the present invention is not limited in application to electrical components but may be used with other types of components and materials.

It is to be understood that suitable modifications may be made in the structure as disclosed, provided such modifications come within the spirit and scope of the appended claims. Having now, therefore, fully illustrated and described my invention, what I claim to be new and desire to protect by Letters Patent is set forth in the appended claims.

What is claimed is:

1. The method of mounting a material to be subjected to forces generated by an acceleration-deceleration test procedure, comprising the steps of: at least partially mounting the material to be tested in a frozen medium and thereafter subjecting the material to the generated forces of the acceleration-deceleration test procedure such that the forces are transmitted to the material through the frozen medium.

2. The method of mounting a material to be subjected to forces generated by an acceleration-deceleration test procedure, comprising the steps of: at least partially mounting the material to be tested in a frozen medium; securing the mounted material to an acceleration-deceleration test apparatus maintained in an atmosphere having a temperature that is less than the freezing point temperature of the medium; and thereafter subjecting the mounted material to mechanical forces generated by the test apparatus, the forces being transmitted from the test apparatus to the material by way of the frozen medium.

3. The method of mounting a material to be subjected to a mechanical test procedure wherein forces are applied to the material, comprising the steps of: at least partially mounting the material to be tested by freezing in-situ in a medium, which medium is selected from a class of mediums which exhibit the characteristics of undergoing a reversible change of state between its liquid and solid states, which change occurs within a tolerable temperature range, and having coefficients of expansion and contraction which can be tolerated by the material to be tested, and is chemically compatible with the material such that no deleterious chemical reaction occurs therebetween, and thereafter subjecting the material to the mechanical test procedure forces while it is so mounted, the forces being transmitted to the material through the frozen medium.

4. The method of mounting a material to be subjected to a mechanical test procedure wherein forces are applied to the material, comprising the steps of: at least partially mounting the material to be tested in a frozen medium; subjecting the material to the mechanical test procedure forces while it is to mounted, the forces being transmitted to the material through the frozen medium; causing the frozen medium to liquify; removing the material from the liquified medium; and thereafter examining the material for determining the effects of the mechanical test procedure forces.

5. The method of mounting a material to be subjected to a mechanical test procedure wherein forces are applied to the material, comprising the steps of: disposing the material to be tested within a container; substantially surrounding the material with a liquid mounting medium; exposing the material and the mounting medium to a temperature less than the medium's freezing temperature for causing the medium to solidify; and thereafter subjecting the material to the mechanical test procedure forces while it is so mounted, the forces being transmitted to the material through the solidified medium.

6. The method of mounting a material to be subjected to a mechanical test procedure wherein forces are applied to the material, comprising the steps of: disposing the material to be tested within a container; at least partially surrounding the material with a liquid mounting medium and exposing the material and the mounting medium to reduced temperatures for causing the liquid medium to solidify whereby at least a portion of the material is mounted in the solidified medium; removing the mounted material from the container; and thereafter subjecting the mounted material to the mechanical test procedure forces, which forces are transmitted to the mounted material through the solidified medium.

7. The method of mounting a material to be subjected to a mechanical test procedure wherein forces are applied to the material, comprising the steps of: disposing the material to be tested within a mold-like container; at least partially surrounding the material with a liquid mounting medium; exposing the material and the medium to reduced temperatures for causing the liquid medium to solidify whereby at least a portion of the material is mounted in the solidified medium; removing the mounted material from the container; securing the mounted material to a suitable test fixture; and thereafter subjecting the material to the mechanical test procedure forces, the forces being transmitted through the solidified medium to the mounted material.

8. The method of mounting a material to be subjected to a mechanical test procedure wherein forces are applied to the material, comprising the steps of: at least partially securing the material to be tested in ice and subjecting the material to the mechanical test procedure forces while it is so secured, the forces being transmitted to the material through the ice.

9. The method of exposing a material to mechanical forces for determining its reaction to such mechanical forces, comprising the steps of: substantially encapsulating the material to be exposed in ice and then exposing the ice to the mechanical forces for transmitting such forces to the material under test.

10. A method for mounting a material to be subjected to shock or vibration forces which method includes the steps of: immersing the component to be tested in water; causing the water to solidify for substantially encapsulating the component in ice; and thereafter placing the encapsulated components in a test fixture for subjecting the component to the desired forces.

11. The method of mounting a material to be subjected to a mechanical test procedure wherein forces are applied to the material, comprising the steps of: disposing the material within a container; substantially filling the container with water; causing the water to solidfy by exposing it to temperatures in the temperature range of from below 0° centigrade to a minus 10° centigrade whereby the material is substantially encapsulated by the ice formed thereby; and thereafter subjecting the material to the mechanical test procedure forces while frozen in the ice, the ice serving to transmit the forces to the material.

12. The method of mounting a material to be subjected to a mechanical test procedure wherein forces are applied to the material, comprising the steps of: disposing the material within a cavity formed in a holding fixture; substantially filling the cavity with water; causing the water to solidify by exposing it to temperatures below 0° centigrade for substantially encapsulating the material in ice; securing the fixture to a test machine maintained in a compartment having a temperature less than 0° centigrade; and thereafter subjecting the material while frozen in the ice to the mechanical test procedure forces, the forces being transmitted by the ice to the material.

13. The method of mounting a material to be subjected to a test procedure, including the application of mechanical forces to the material, comprising the steps of: disposing the material within a container; substantially filling the container with water; causing the water to solidify for substantially encapsulating the material in ice; subjecting the material to the mechanical test procedure forces while frozen in the ice, the mechanical forces being transmitted to the material by the ice; permitting the ice to melt; and thereafter performing the remainder of the test procedure.

References Cited by the Examiner

UNITED STATES PATENTS

| | | | |
|---|---|---|---|
| 2,334,941 | 11/43 | Linden | 62—1 |
| 2,662,401 | 12/53 | Bailly | 73—38 X |
| 2,696,105 | 12/54 | Mackas | 73—12 |
| 3,106,653 | 10/63 | Fowler | 73—71.6 X |

RICHARD C. GUEISSER, *Primary Examiner.*